United States Patent Office 3,849,429
Patented Nov. 19, 1974

3,849,429
HALOGENATION OF DIAMINOPYRIDINES IN ACIDIC MEDIA
Max M. Boudakian, Pittsford, N.Y., assignor to Olin Corporation
No Drawing. Filed Mar. 30, 1973, Ser. No. 346,379
Int. Cl. C07d 31/42
U.S. Cl. 260—296 R                    10 Claims

ABSTRACT OF THE DISCLOSURE

This invention relates to the preparation of halogenated diaminopyridines and substituted diaminopyridines by the reaction of a selected diaminopyridine in an acidic media comprised of hydrogen peroxide and a hydrohalide acid.

---

This invention relates to a method for preparing halogenated diaminopyridines and substituted derivatives thereof.

Although it has been known to halogenate monoaminopyridines in acidic media, it has long been recognized in the art that diaminopyridines and particularly, 2,6-diaminopyridine could not be subject to halogenation under such conditions because of the extreme hydrolytic lability of the amino groups on the ring which convert over to the hydroxy group. Thus as cited in U.S. Pat. 3,579,528 hydrolysis of one or both of the amino groups will occur during halogenation of 2,6-diaminopyridine in an acid environment. U.S. Pat. 1,830,301 indicates that halogenated diaminopyridines can be obtained in an indirect method by protection of the amino groups by acetylation, followed by successive halogenation and deacetylation.

Now it has been surprisingly found that diaminopyridines and substituted derivatives thereof can conveniently be prepared in high yield in an acidic media using the conditions as defined herein. More particularly, selected diaminopyridines can be halogenated in a media comprising hydrogen peroxide and a hydrohalide acid at a temperature of from about 0 to about 70° C. Such reaction is illustrated by the following equation wherein 2,6-diaminopyridine is the starting material and HCl is the hydrohalide acid:

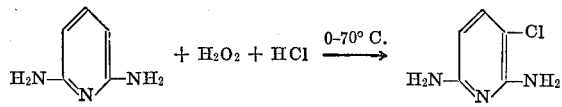

This result is particularly surprising because of the significant degree of hydrolytic lability which diaminopyridines possess as noted earlier.

The halogenated diaminopyridine compounds prepared by the method of this invention will have the following general formula:

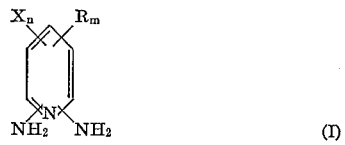     (I)

wherein X is a halogen selected from the group consisting of chlorine, bromine and iodine; each R is independently selected from the following groups; hydrogen, alkyl and more particularly, lower alkyl of 1 to 4 carbon atoms; halogen and more particularly chlorine, bromine, fluorine and iodine; alkoxy and more particularly alkoxy of 1 to 4 carbon atoms; nitro; and phenyl; $n$ is an integer of 1 to 3 and $m$ is an integer of 0 to 2. In addition to the above noted substituents, the compounds (I) may include other known substituents which will not affect or interfere with the reaction.

The starting materials for this invention include diaminopyridines and substituted diaminopyridines having the formula:

     (II)

wherein each R is independently selected from the following groups: hydrogen; alkyl and more particularly lower alkyl of 1 to 4 carbon atoms, e.g. methyl, propyl and butyl; halogens and more particularly bromine, chlorine, fluorine and iodine; alkoxy and more particularly alkoxy having 1 to 4 carbon atoms, e.g. methoxy, ethoxy, butoxy; nitro; and phenyl; and $m$ is an integer of 0 to 2.

Illustrative of such starting materials are the following: 2,6-diaminopyridine, 2,3-diaminopyridine, 2,4 - diaminopyridine, 2,5-diaminopyridine, 3,4-diaminopyridine, 3,5-diaminopyridine, 4-methyl-2,3-diaminopyridine-5-bromo-2,3-diaminopyridine, 3-nitro-2,4-diaminopyridine, 6-methyl-2,5-diaminopyridine, 3-bromo-2,6-diaminopyridine, 4-methyl-2,6-diaminopyridine, 3-nitro - 2,6 - diaminopyridine, 3-methoxy-2,6-diaminopyridine, 6-chloro - 3,4 - diaminopyridine, 6-methyl-3,4-diaminopyridine, and 2-bromo-3,5-diaminopyridine. Further illustrations of compounds having the above-designated formula are disclosed in "The Chemistry of Heterocyclic Compounds," edited by Arnold Weissberger, Part 3, Chapter IX, *Aminopyridines,* Andrew S. Tomcufcik and Lee N. Starker, 1962, Interscience Publishers, New York.

It is noted that while any of the above-designated diaminopyridines may be used in this method, particularly preferred compounds are 2,6-diaminopyridine and the substituted derivatives thereof. It is further noted that in addition to the substituents noted above, the compounds II may include other known substituents which will not affect or interfere with the reaction.

The hydrohalide acid compound used in carrying out the method of this invention may be selected from the group consisting of HCl, HBr and HI depending upon the particular halo substituted compound that is desired to be prepared.

While hydrogen peroxide is the preferred oxidizing compound, other substances such as sodium peroxide, potassium chlorate, potassium bromate and potassium permanganate may be used in the same manner as hydrogen peroxide.

In carrying out the method of this invention the amount of acid compound used will generally vary from about 1:1 to about 20:1 and preferably from about 4:1 to about 15:1 moles of acid per mole of diaminopyridine compound.

The amount of hydrogen peroxide used will generally vary from a molar ratio of about 0.5 to about 4.25 and preferably from about 0.75 to about 3.25 moles of hydrogen peroxide per mole of diaminopyridine compound. While the amount of hydrogen peroxide used will generally vary between the above designated amounts, the particular amount used will depend on the desirability of obtaining the mono or dihalo-substituted diaminopyridine or even the tri-substituent diaminopyridine. For the monohalo-substituted compound the preferred ratio will generally vary from about 0.75 to about 1.25 whereas for the dihalo-substituted compound, the preferred amount will vary from about 1.75 to about 2.25.

The particular concentrations of the acid and peroxide compound can vary widely. Generally the hydrogen peroxide concentration will vary from 1 to 90% and more preferably from 15 to 35% in aqueous media.

The temperature at which the reaction is carried out is very important and generally will vary from about 0 to about 70° C. and preferably from about 20 to about 40° C. The reaction is preferably run at atmospheric pressure but somewhat higher or lower pressures may be used if desired. More particularly the pressure will range from about 0.5 to about 10 atmospheres.

The reaction time for this method can vary widely and is not particularly critical. Generally a reaction time or hold period of from about 10 mins. to about 3 hrs. will be sufficient.

While it is not necessary to use a solvent, inert organic solvents may be used in carrying out the reaction if desired.

After the reaction of the selected diaminopyridine compound in the hydrohalide acid and hydrogen peroxide media, neutralization of the reaction mixture is performed using any of the well-known basic or alkaline materials. Generally it is desired to obtain a pH of about 8 to about 10 when neutralizing.

The compounds prepared by the method of this invention have a variety of uses and are particularly useful as bactericidal agents and also as intermediates for preparing other bactericidal compounds.

The following examples are further illustrative of the method of this invention.

EXAMPLE I

To a solution of 31.5% hydrochloric acid (616 g.; 5.4 moles) and 2,6-diaminopyridine (54.5 g.; 0.50 mole), 30% hydrogen peroxide (56.7 g.; 0.50 mole) was added over a 40 min. period (initial temp., 23° C.; final temp., 36° C.). After a ½ hour hold period at 34° C., the solution was neutralized to pH 8–10 with 50% NaOH (195 ml.) at 0° C. The reaction product was filtered and slurried three times each with 150 ml. of water. The product was dried at 40° C., wt. 43 g. (60% yield), m.p. 172–174° C.

ANALYSIS

| | Percent |
|---|---|
| N, Found | 30.05 |
| Calc. for $C_5H_6ClN_3$ | 29.27 |
| Non-aqueous titration (perchloric acid in glacial acetic acid solvent): | |
| Neutralization equivalent: | |
| Found | 150.3 |
| Calc. | 143.53 |
| Vapor Phase Chromatography (VPC) (5% Versamid 900—a polyamide resin) | 94.7 |

EXAMPLE II 2,6-Diaminopyridine (0.50 mole, 54.5 g.) was added to 48.5% hydrobromic acid (1048.9 g.; 6.28 moles) (max. temp. 25° C.). Hydrogen peroxide (30% concentration; 56.7 g.; 0.50 mole) was then added during a 13 minute period (initial temp., 24°; final temp., 34° C.). After a half-hour hold period, the reaction mixture was then neutralized at 0° C. to pH 8–10 with 23% sodium hydroxide. The reaction mixture was slurried with 2× 300 ml. each of water, filtered and dried at 40° C., wt. 71.2 g. (75.8% yield), m.p. 169–172° C.

ANALYSIS

| | Percent |
|---|---|
| Non-aqueous titration (perchloric acid in glacial acetic acid solvent): | |
| Neutralization equiv.: | |
| Found | 197.1 |
| Calc. | 188.0 |
| VPC (5% Versamid 900) | 89 |

Product purification was effected as follows: crude 3-bromo-2,6-diaminopyridine (22.2 g.) was heated to reflux with toluene (175 ml.) and filtered hot. The toluene-insoluble precipitate (15.2 g.) had m.p. 175–176° C. (Lit. m.p. for 3-bromo - 2,6 - diaminopyridine: 174–175° C.; 176° C.).

ANALYSIS

Non-aqueous titration (perchloric acid in glacial acetic acid solvent):

| Neutralization equiv.: | Percent |
|---|---|
| Found | 192.0 |
| Calc. | 188.0 |
| VPC (5% Versamid 900) | 96.6 |

What is claimed is:

1. A method of preparing halogenated diaminopyridines and halogenated substituted diaminopyridines of the formula:

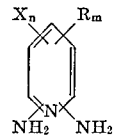

wherein X is a halogen selected from the group consisting of chlorine, bromine and iodine; each R is independently selected from the group consisting of hydrogen, alkyl of 1 to 4 carbon atoms, nitro halogen, alkoxy of 1 to 4 carbon atoms, and phenyl; n is an integer of 1 to 3 and m is an integer of 0 to 2 which comprises reacting a compound of the formula:

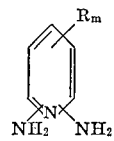

wherein R and m are as defined above;

in the presence of hydrogen peroxide and a hydrohalide acid selected from the group consisting of HCl, HBr, and HI at a temperature of from about 0 to about 70° C.

2. The method of claim 1 wherein the amount of hydrogen peroxide used is from about 0.5 to about 4.25 moles of hydrogen peroxide per mole of diaminopyridine compound and the amount of hydrohalide acid used is from about 1 to about 20 moles of acid per mole of diaminopyridine compound.

3. The method of claim 2 wherein said diaminopyridine compound is 2,6-diaminopyridine.

4. The method of claim 1 wherein the amount of hydrogen peroxide used is from about 0.75 to about 3.25 moles of hydrogen peroxide per mole of diaminopyridine compound and the amount of hydrohalide acid used is from about 4 to about 15 moles of acid per mole of diaminopyridine compound.

5. The method of claim 4 wherein the reaction is carried out at a temperature of from about 20 to about 40° C.

6. The method of claim 5 wherein said diaminopyridine compound is 2,6-diaminopyridine.

7. The method of claim 6 wherein said hydrohalide acid is HCl.

8. The method of claim 7 wherein the amount of hydrogen peroxide used is from about 0.75 to about 1.25 moles of hydrogen peroxide per mole of diaminopyridine compound.

9. The method of claim 6 wherein said hydrohalide acid is HBr.

10. The method of claim 9 wherein the amount of hydrogen peroxide used is from about 0.75 to about 1.25 moles of hydrogen peroxide per mole of diaminopyridine compound.

References Cited
UNITED STATES PATENTS
3,579,528    5/1971    Haszeldine et al. ___ 260—296 R ALAN L. ROTMAN, Primary Examiner